United States Patent
Yukisawa et al.

[19]

[11] Patent Number: 5,985,199
[45] Date of Patent: Nov. 16, 1999

[54] METHOD AND MOLD FOR MOLDING SLIDE FASTENER SLIDER BODY

[75] Inventors: Saburo Yukisawa; Tsutomu Tomita; Hideo Takabatake, all of Toyama, Japan

[73] Assignee: YKK Corporation, Tokyo, Japan

[21] Appl. No.: 08/912,335

[22] Filed: Aug. 18, 1997

[30] Foreign Application Priority Data

Aug. 20, 1996 [JP] Japan ................................ 8-218520

[51] Int. Cl.⁶ ........................................... B29C 33/76
[52] U.S. Cl. ..................... 264/328.1; 249/142; 264/334; 425/545; 425/556
[58] Field of Search ............................. 264/328.1, 334, 264/318, 252; 425/545, 814, 556; 29/408, 409; 24/385, 415–417, 427–430; 249/142

[56] References Cited

U.S. PATENT DOCUMENTS

| | | | |
|---|---|---|---|
| 2,495,539 | 1/1950 | Natzler et al. | 249/142 |
| 2,519,171 | 8/1950 | Bolten, Jr. | 425/814 |
| 2,705,345 | 4/1955 | Epple | 249/142 |
| 2,736,062 | 2/1956 | Scheuermann et al. | 425/814 |
| 4,515,342 | 5/1985 | Boskovic | 249/122 |
| 4,790,973 | 12/1988 | Minami et al. | 249/142 |
| 5,013,511 | 5/1991 | Akashi | 425/814 |
| 5,073,103 | 12/1991 | Liao | 425/814 |
| 5,604,962 | 2/1997 | Mayerhofer | 425/814 |
| 5,632,070 | 5/1997 | Wakabayashi | 24/429 |
| 5,698,243 | 12/1997 | Wakabayashi | 425/814 |

FOREIGN PATENT DOCUMENTS

| | | |
|---|---|---|
| 34-4626 | 4/1959 | Japan . |
| 6-61288 | 8/1994 | Japan . |
| 7-213311 | 8/1995 | Japan . |

*Primary Examiner*—Jill L. Heitbrink
*Attorney, Agent, or Firm*—Hill & Simpson

[57] ABSTRACT

In a mold for molding a slide fastener slider, a first template has a first part of a cavity for molding a rear section of an outer contour of the slider body except an upper surface portion of an upper wing and also has a first core for molding a rear section of an element guide channel of the slider body; a second template which is movable toward and away from the first template has a second cavity part for molding a front section of the outer contour of the slider body and also has a second core for molding a front section of the element guide channel; and a third template which is slidable on the first and second templates has a third part of the cavity for molding a pull-tab attaching lug of the slider body and an outer contour of the upper surface portion/shape of the upper wing. For molding, these templates are brought together to form the cavity, and then molten molding material is poured into the cavity via a channel and a sprue. After solidification of the molding material, the second template together with the third template is moved horizontally away from the first template and then the third template is slid upwardly, in response to which an eject pin projects from the second template to remove a molded product off the mold.

6 Claims, 5 Drawing Sheets

METHOD AND MOLD FOR MOLDING SLIDE FASTENER SLIDER BODY

BACKGROUND OF THE INVENTION

1. Field of the Invention

This invention relates to a method of and a mold for molding a slide fastener slider body, and more particularly to such method and mold, in which the slider body can be manufactured easily, in which an element guide channel in the slider body is excellently accurate in size of inside diameter, and which facilitate removing a molded product from the mold.

2. Description of the Related Art

A conventional method for manufacturing a slide fastener slider body by die-casting or injection-molding comprises forming a molding cavity by a suitable combination of a fixed template, a movable template and various cores, pouring molten molding material into the cavity, solidifying the molding material, retracting the movable template and the cores from the fixed template, and removing a molded slider body. Each of the projections, auxiliary template or associated member is fixedly or slidably attached to the fixed template or the movable template, as exemplified by Japanese Utility Model Publication No. Sho 34-4626, Japanese Patent Publication No. Hei 6-61288 and Japanese Patent Laid-Open Publication No. Hei 7-213311.

In this conventional method, since a slider body to be molded has an element guide channel and a pull-tab attaching lug, it is inevitable to use the templates or the cores whose movement and shape are complex and accuracy of inside diameter size of the element guide channel would be lowered due to the wear of the core for forming the element guide channel or adequate separation of molding material would be difficult to achieve due to the non-uniform application of a peeling agent to the templates and the cores for forming the element guide channel or excessive adhesion of the slider body.

Further, it would be necessary to slide a plurality of cores and templates in two or more axial directions so that the effective volume of the mold composed of the fixed template and the movable template cannot be utilized to a maximum.

SUMMARY OF THE INVENTION

It is therefore an object of this invention to provide a method and a mold, for molding a slide fastener slider body without foregoing conventional problems. More particularly, the object is to provide the molding method, which facilitates manufacturing a set of molding templates and enable good removal of a molded product in a simple operation, in which the accuracy of size of inside diameter of an element guide channel of a slider body can be improved, and in which the molded material has an excellent removability.

Another object of the invention is to provide a mold, for molding a slide fastener slider body, in which the effective volume of the mold can be utilized to a maximum.

According to a first aspect of the invention, the above object is accomplished by a method of molding a slide fastener slider body having upper and lower wings, which are integrally connected at their front ends by a connector post and define between the upper and lower wings a fastener-element guide channel, and a pull-tab attaching lug on an upper surface of the upper wing, of the invention. The method comprises the steps of: moving a second template into contact with a first template to define between the second template and the first template a first part of a cavity for molding part of an outer contour of the slider body and an inner contour of the slider body; moving a third template perpendicularly to the direction of movement of the second template in such a manner that the third template is pressed against fitting surfaces of the second template and the first template to define a second part of the cavity for molding the pull-tab attaching lug and an upper-surface shape of the upper wing; filling the cavity with a molding material to obtain a molded product; separating the second template and the third molding template from the first template with the molded product held in the second template; moving the third template perpendicularly to the direction of movement of the second template to separate from the second template and the molded product; and removing the molded product from the second template. Preferably, the removal of the molded product from the second template is performed by an eject pin.

According to a second aspect of the invention, the method can be carried out by a mold for molding a slide fastener slider body having upper and lower wings, which are integrally connected at their front ends by a connector post and define between the upper and lower wings a fastener-element guide channel, and a pull-tab attaching lug on an upper surface of the upper wing. The mold comprises: a first template having a first part of a cavity for molding a front or a rear section of an outer contour of the slider body except an upper surface portion of the upper wing and having a first core for molding a front or a rear section of an element guide channel; a second template movable toward and away from the first template and having a second part of the cavity for molding the rear or the front section of the outer contour of the slider body and having a second core for molding the rear or the front section of the element guide channel; and a third template movable perpendicularly to the direction of movement of the second template and hanging a third part of the cavity for molding the pull-tab attaching lug and an outer contour of the upper surface portion of the upper wing and adapted to be fitted with fitting surfaces of the second template and the first template.

As described above, each of the parts of the cavity of the first and second templates is for molding the front section or the rear section of the outer contour of the slider body, and these templates define the outer contour of the slider body except the upper surface portion of the upper wing while the corresponding cores are fixed to the templates depending on each of the parts of the cavity is whether for the front section or for the rear section of the element guide channel, respectively. In order for good accuracy of size of inside diameter of the element guide channel and also for good application of a peeling agent and in view of the removability, it is preferable that the fixed first template has a partial cavity for molding the rear section of the outer contour of the slider body except the upper surface portion of the upper wing and has a fixed core for molding the rear section of the element guide channel, and the movable second template has a partial cavity for molding the front section of the outer contour of the slider body except the upper surface portion of the upper wing and has a fixed core for molding the front section of the element guide channel.

Further, in order to introduce a molten molding material into the slider body molding cavity, the fixed first template has a channel opening to a parting surface, and the movable second template has a sprue communicating with the cavity and adapted to be aligned with such opening of the channel. The passageway from the sprue to the cavity is preferably defined by the opening in the parting surface of the movable template and the parting surface of the fixed template. And the shape of the passageway from the opening of the channel to the cavity may be straight or may be bent at an intermediate position. And the molten material is poured in the slider body molding cavity via a gate. Preferably, the gate is disposed at a position corresponding to the connector-post-forming section on or near the lower surface of the lower wing. The gate may be in the form of either a point or a slit.

On the other hand, the movable second template has an eject pin adapted to project toward and retract from the first template for pushing the connector post of the molded slider body off the second template. The third template is slidable along the parting surface of the second and first templates, usually in the vertical direction or in the front-rear (horizontal) direction with respect to the second template. The orientation of the cavity varies by 90° depending on the direction of sliding of the third template.

According to this invention, since the mold is composed of three kinds of templates, i.e. the fixed first template, the movable second template and the slidable third template, and partly since the slidable template having a partial cavity for molding the outer contour of the pull-tab attaching lug and the outer contour of the upper surface portion of the upper wing is slidably supported on the second template and is slidable perpendicularly to the direction of parting of the second and first templates, it is possible to remove a molded slider body off the cavity smoothly in a simple operation though the slider body has the pull-tab attaching lug. Also this facilitates manufacturing the mold and applying of a peeling agent to the cores so as to prevent the molding material from sticking to the mold. Assuming that the first template has a partial cavity for molding the rear section of the outer contour of the slider body and also has a core for molding the rear section of the element guide groove, it is possible to improve the accuracy of size of inside diameter of the element guide channel.

DETAILED DESCRIPTION OF THE PREFERRED EMBODIMENTS

Various preferred embodiments of this invention will now be described in detail with reference to the accompanying drawings. This invention should by no means be limited to these illustrated embodiments. FIGS. 1 through 6 show a first embodiment.

Figure 1:
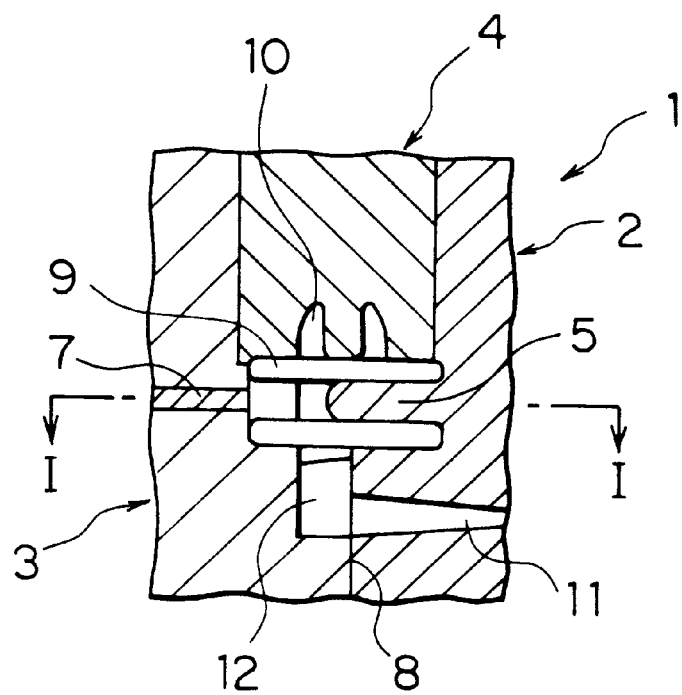
FIG. 1 is a vertical cross-sectional view of a mold, for molding a slide fastener slider body, according to a first embodiment of this invention, showing the mold as closed.
Figure 2:
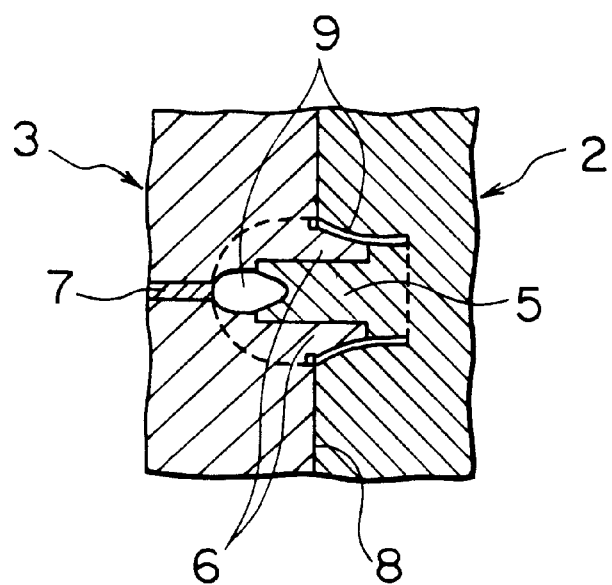
FIG. 2 is a cross-sectional view taken along line I—I of FIG. 1.

FIG. 1 is a vertical cross-sectional view of a mold, for molding a slide fastener slider body, according to a first embodiment of the invention, showing an arrangement of the mold in a first step of the molding method. The mold 1 comprises a fixed first template 2, a movable second template 3, and a slidable third template 4 slidably supported on the second template 3. The first template 2 has a first partial cavity for molding a rear section of outer contour of the slider body except an upper surface portion of an upper wing and a first guide portion along which one part of the third template 4 is slidable, and also has a first core 5 for molding a rear section of an element guide channel of the slider body. The second template 3 has a second partial cavity for molding a front section of outer contour of the slider body except the upper surface portion of the upper wing and a second guide portion for molding the other part of the third template 4, and also has a second core 6 for molding a front section of the element guide channel.

On the other hand, the third template 4 has two parallel grooves 10 for molding a pair of pull-tab attaching lugs and a third partial cavity for molding the outer contour of the upper surface portion of the upper wing. As these templates 2, 3, 4 are brought together, a molding cavity 9 for molding the contour of the slider body is formed. The third template 4 is movable perpendicularly to the direction of closing and opening of the fixed and movable templates 2, 3 (vertically in FIG. 1). The first template 2 has a channel 11 from which molten molding material such as zinc alloy is to be introduced into the molding cavity 9 and which opens to a parting surface 8. The second template 3 has a sprue 12 opening to the parting surface 8 and adapted to be aligned with the opening of the channel 11. The sprue 12 communicates with the vicinity of a lower portion of a connector-post-forming part of the molding cavity 9 right above the sprue 12; the sprue 12 will be connected with the channel 11 as the first and second templates 2, 3 are brought together. Further, the second template 3 has an eject pin 7 adapted to project and retract from a front portion of the connector-post-forming part in the direction of closing and opening of the first and second templates 2, 3.

As shown in FIG. 1., which is a cross-sectional view taken along line I—I of the slider body mold of FIG. 1, the first and second templates 2, 3 have first and second cores 5, 6, respectively, for molding partial cavities for molding the element guide channel and the connector post. The first core 5 of the first template 2 has a shape corresponding the shape of the rear section of the element guide channel, and the second core 6 of the second template 3 has a shape corresponding to the front section of the element guide channel. Further, the first template 2 has a shape corresponding to the outer contour of the rear section of the slider body, and the second template 3 has a shape corresponding to the outer contour of the front section of the slider body. The molding cavity 9 of FIG. 2 includes a connector-post-forming portion and a flange-forming portion.

Figure 3:
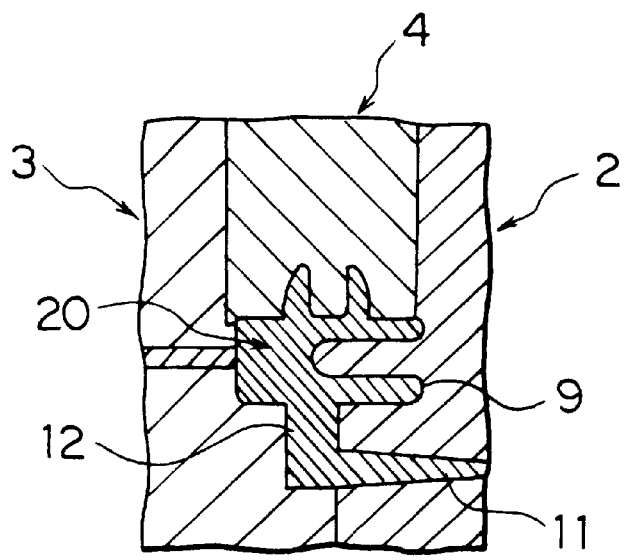
FIG. 3 is a vertical cross-sectional view showing the mold with its molding cavity filled with molding material.

FIG. 3 shows the closed mold with the molding cavity 9 filled with molding material. In this step, the molten molding material for the slider body 20 to be molded is filled into the molding cavity 9 via the channel 11 and the sprue 12. As the sprue 12 communicates with the lower-wing-forming part of the molding cavity 9 at the lower portion of the connector-post-forming part, the molten molding material flows into the cavity portion for molding the rear section of the lower wing and into the cavity portions for molding the pull-tab attaching lugs and the upper wing via the connect-post-forming part.

Figure 4:
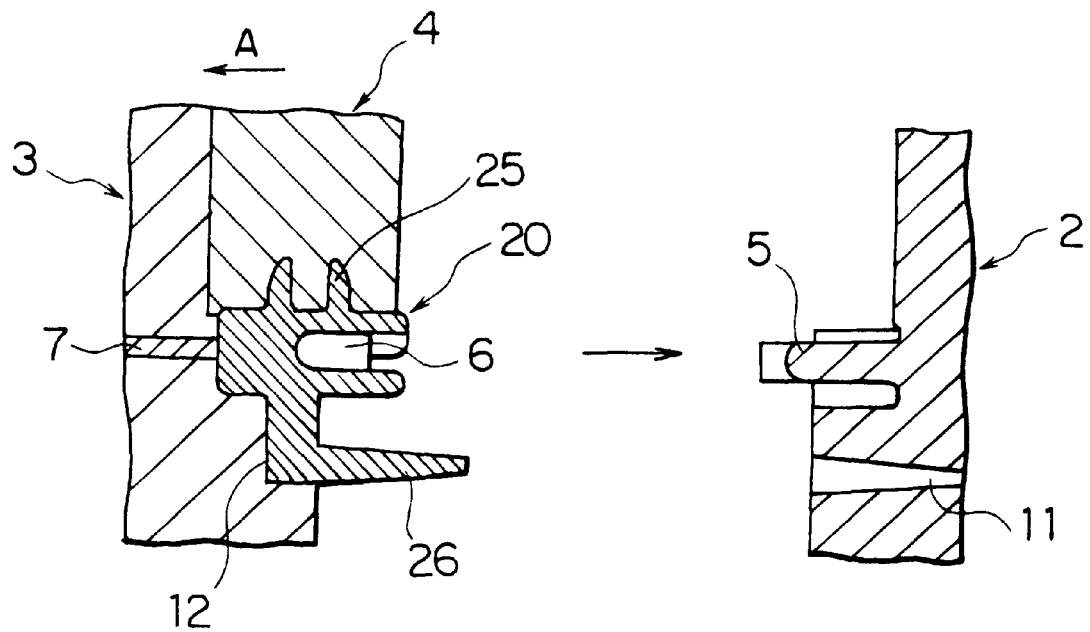
FIG. 4 is a vertical cross-sectional view showing the mold as opened.

FIG. 4 shows the mold in opened posture in which the second template 3 is moved away from the first template 2. In this step, after solidification of the molding material filled in the molding cavity 9, the second template 3 together with the third template 4 is moved in the direction of an arrow A. The molded product (slider body) 20 formed by the molding cavity 9 is moved as being held on the second template 3 even after the second template 3 is separated from the first template 2 in the direction of the arrow A, because the second template 3 and the third template 4 are in tight contact with the pull-tab attaching lugs 25 of the molded product 20 being received in the grooves 10 of the third template 4.

Figure 5:
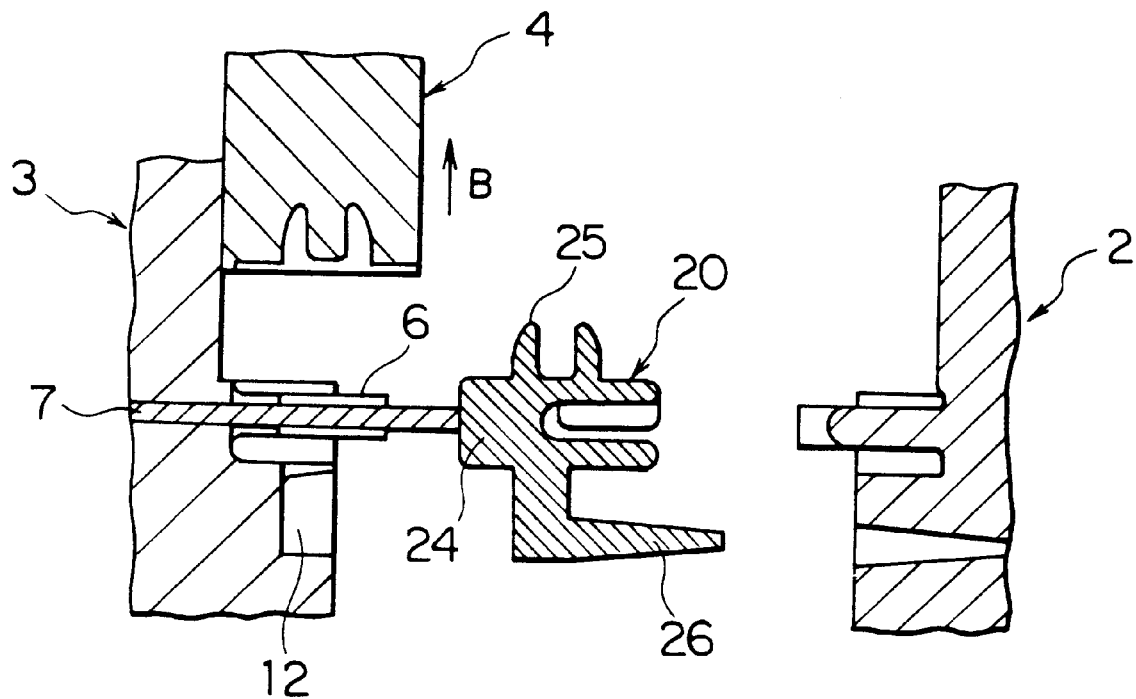
FIG. 5 is a vertical cross-sectional view showing the mold with a molded product ejected from a movable second template.
Figure 6:
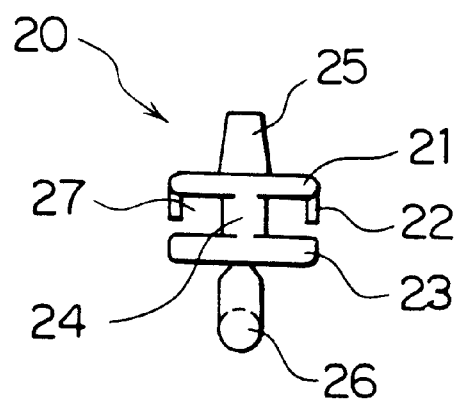
FIG. 6 is a front view of the molded product ejected from the second template.

FIG. 5 shows the mold in fully opened posture in which the molded product 20 is ejected off the second template 3 by the eject pin 7. In this step, upon completion of movement of the second template 3, the third template 4 is moved in the direction of an arrow B to remove the pull-tab attaching lugs 25 of the molded product 20 from the grooves 10 of the third template 4, and in response to the movement of the third template 4, the eject pin 7 is moved to project from the second template 3. As a result, the eject pin 7 pushes a connector post 24 of the molded product 20 on its front surface from the left side in FIG. 5 to remove the second core 6 of the second template 3 off the element guide channel so that the molded product 20 drops from the second template 3. FIG. 6 is a front view of the molded product 20 manufactured by the foregoing steps. The molded product 20 has a runner 26 integrally formed with the slider body and bottle-necked at its gate portion so as to be separated from the slider body at ease by cutting in a subsequent step.

Figure 7:
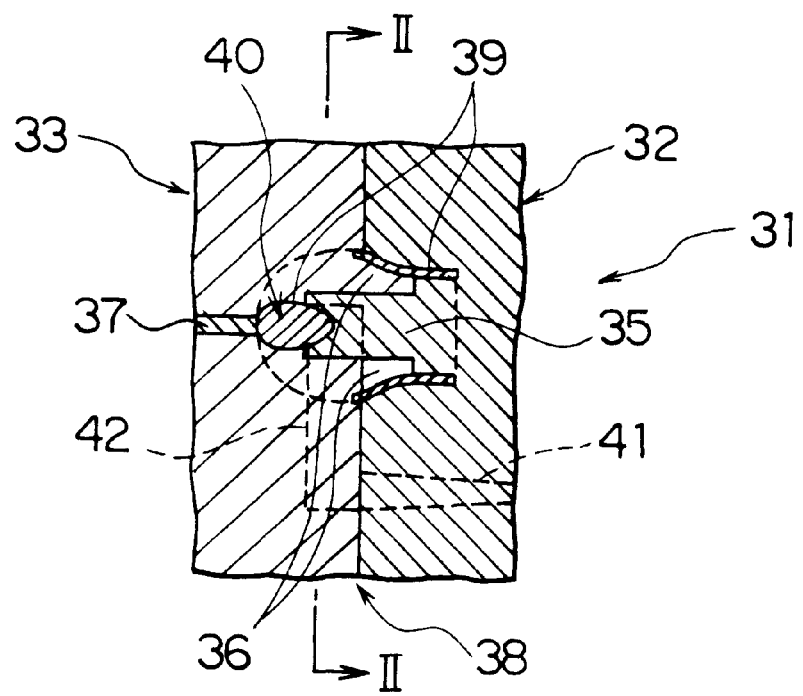
FIG. 7 is a vertical cross-sectional view of a mold, for molding a slide fastener slider body, according to a second embodiment of the invention, showing the mold as closed.
Figure 8:
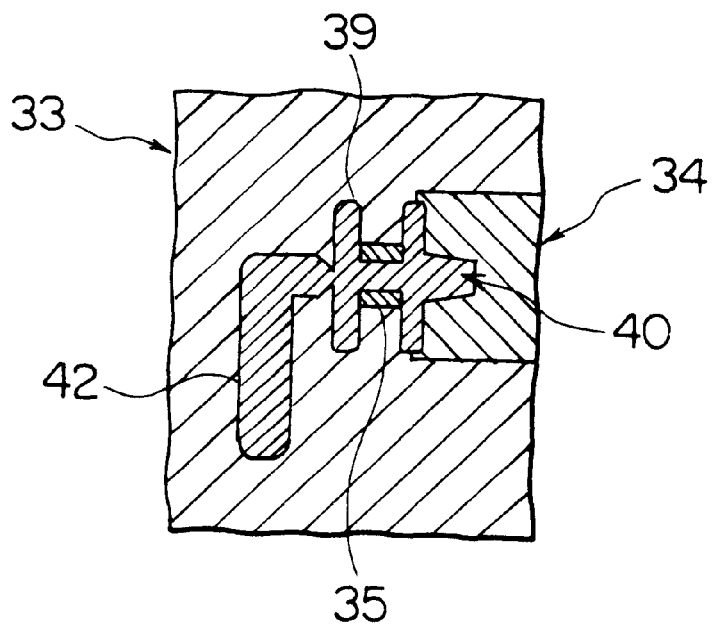
FIG. 8 is a cross-sectional view taken along line II—II of FIG. 7.

FIGS. 7 and 8 shows a mold, for molding a slide fastener slider body, according to a second embodiment. In the foregoing embodiment, the third template 4 moves vertically with respect to the arrangement of the first template 2 and the second template 3, whereas in this embodiment, a third template 34 is movable in the front-rear direction (horizontally) with respect to a fixed first template 32 and a movable second template 33. Accordingly the slider body 40 is molded in a horizontal posture rather than a vertical posture. Namely, as shown in FIG. 7, in the mold 31, the first template 32 and the second template 33 are brought into contact with each other at their parting surface 38, and the third template 34 is brought into tight contact with the first and second templates 32, 33 horizontally from the right side in FIG. 8, which is a cross-sectional view taken along line II—II of FIG. 7, to form a molding cavity 39 so that the slider body 40 can be molded in a horizontal posture.

Finally, the molding material is filled horizontally into the molding cavity 39 via a channel 41 and a sprue 42. In this embodiment, the channel 41 extends horizontally in the first template 32, and the sprue 42 communicating with the channel 41 extends along the parting surface of the second template 33 and communicates via a gate with the connector-post-forming part of the molding cavity 39 at the lower-wing-forming side. In the second embodiment, utilization of the space can be realized in the case that there is only small space since the third template 34 slides horizontally.

Figure 9:
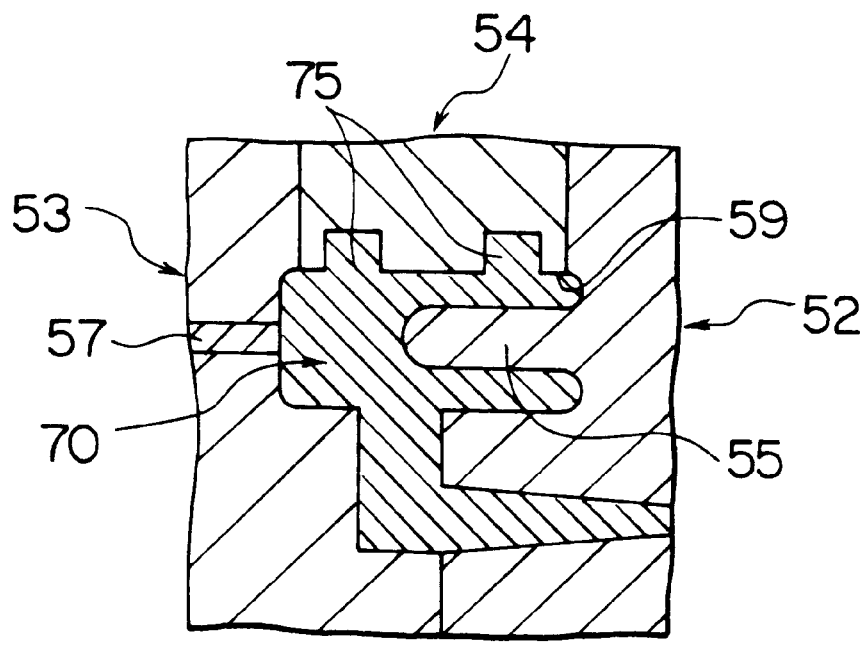
FIG. 9 is a vertical cross-sectional view of the mold, showing a modification in which a molding portion for molding pull-tab attaching lugs on an ripper wing of the slider body.
Figure 10:
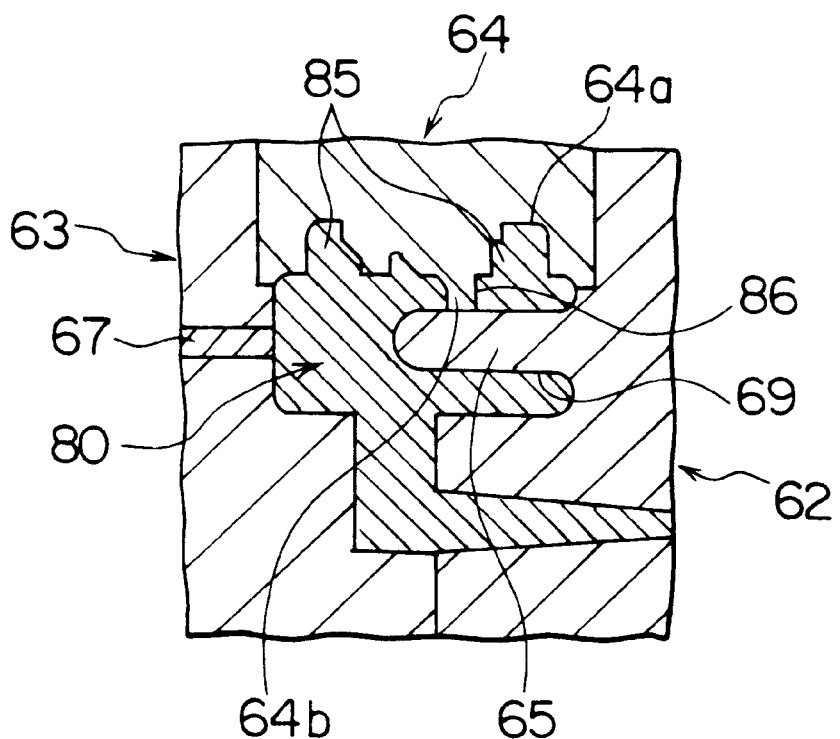
FIG. 10 is a vertical cross-sectional view showing another modification of the molding portion for the attaching lugs.

FIGS. 9 and 10 respectively show modifications in which the slidable third template have different shapes. In the third and fourth embodiments, each slider body 70, 80 which is a molded product, in FIG. 9 and 10, is a type in which a cover is to be attached to a pair of pull-tab attaching lugs 75, 75; 85, 85 so as to assemble the pull tab on the slider body 70, 80. The mold of FIG. 9 has a molding cavity for molding a so-called free slider body having the lugs 75 to which the cover is to be secured by clenching. The mold of FIG. 10 has a molding cavity for molding an autolock slide fastener slider body and hence has grooves 64a for molding the pull-tab attaching lugs 85 and a projection 64b for molding a locking-pawl-insertion hole 86 of the upper wing.

As is apparent from the foregoing detailed description, according to the first embodiment of this invention, in molding a slide fastener slider body, it is possible to remove a molded product 20 smoothly in simple movements of the templates 2, 3, 4. The mold 1 is simple in structure and hence is easy to manufacture. And it is possible to apply a peeling agent to the cores 5, 6 uniformly so that the slider body molding material can be prevented from sticking to the mold. If the first template 2 has an outer contour corresponding to the rear section of the slider body and a core 5 for molding the rear section of the element guide channel, it is possible to improve the accuracy of size of inside diameter of the element guide channel. With this improved peeling, it is possible to retard sticking of the molding material, such as of zinc, to the mold 1 so that labor for cleaning the mold can be reduced. Since the molten material is poured into the upper-wing-forming part of the molding cavity 9 via the connector-post-forming part from its rear lower side, smooth filling of the molten material can be achieved. Also in forming the locking-pawl-insertion hole, the molten material flows to the underside of the locking-pawl-insertion hole so that a molded product 20 neat in appearance can be expected.

The same advantageous results can be realized in any other embodiment and modifications described above.

What is claimed is:

1. A method of molding a slide fastener slider body having upper and lower wings, which are integrally connected at their front ends by a connector post and define between the upper and lower wings a fastener-element guide channel, and a pull-tab attaching lug on an upper surface of the upper wing, said method comprising the steps of:

(a) moving a second template into contact with a first template to define between said second template and said first template a first part of a cavity for molding part of all outer contour of the slider body and an inner contour of the slider body;

(b) moving a third template, which is slidably supported on said second template, perpendicularly to the direction of movement of said second template in such a manner that the third template is pressed against fitting surfaces of the second template and the first template to define a second part of the cavity for molding the pull-tab attaching lug and an upper-surface shape of the upper wing;

(c) filling the cavity with a molding material to obtain a molded product;

(d) separating the second template and the third template from the first template with said molded product held in the second template;

(e) moving the third template perpendicularly to the direction of movement of the second template to separate from the second template and the molded product; and (f) removing the molded product from the second template.

2. A method according to claim 1, wherein said removing of the molded product from the second template is performed by an eject pin.

3. A mold for molding a slide fastener slider body having upper and lower wings, which are integrally connected at their front ends by a connector post and define between the upper and lower wings a fastener-element guide channel, and a pull-tab attaching lug on an upper surface of the upper wing, said mold comprising:

(a) a first template having a first part of a cavity for molding a front or a rear section of an outer contour of the slider body except an upper surface portion of the upper wing and having a first core for molding a front or a rear section of an element guide channel;

(b) a second template movable toward and away from said first template and having a second part of said cavity for molding the rear or the front section of the outer contour of the slider body and having a second core for molding the rear or the front section of the element guide channel; and (c) a third template slidably supported on said second template and movable perpendicularly to the direction of movement of said second template and having a third part of said cavity for molding the pill-tab attaching lug and an outer contour of the upper surface portion of the upper wing and adapted to be fitted with fitting surfaces of said second template and said first template.

4. A mold according to claim 3, wherein said first part of said cavity of said first template is for molding the rear section of the outer contour of the slider body except the upper surface portion of the upper wing while said first core of said first template is for molding the rear section of the element guide channel, and said second part of said cavity of said second template is for molding the front section of the outer contour of the slider body except the upper surface portion of the upper wing while said second core of said second template is for molding the front section of the element guide channel.

5. A mold according to claim 3, wherein said first template has a channel opening to a parting surface, and said second template has a sprue communicating with said cavity and adapted to be aligned with such opening of said channel.

6. A mold according to claim 4, wherein said second template has an eject pin adapted to project toward and retract from said first template for pushing the connector post of the molded slider body off said second template.

* * * * *